United States Patent [19]

Schueman

[11] Patent Number: 5,507,511
[45] Date of Patent: Apr. 16, 1996

[54] MEANS FOR CONTROLLING AN AIR POWERED ACTUATOR FOR RETRACTING THE LOCKING PINS OF A SLIDER

[75] Inventor: Gerald L. Schueman, Oakland, Iowa

[73] Assignee: Schueman Enterprises, Inc., Oakland, Iowa

[21] Appl. No.: 517,810

[22] Filed: Aug. 22, 1995

Related U.S. Application Data

[63] Continuation-in-part of Ser. No. 295,203, Aug. 24, 1994, which is a continuation-in-part of Ser. No. 243,984, May 17, 1994, Pat. No. 5,460,237, which is a continuation-in-part of Ser. No. 195,852, Feb. 10, 1994, Pat. No. 5,449,187.

[51] Int. Cl.$^6$ .................................................. B60G 5/00
[52] U.S. Cl. ...................... 280/149.2; 280/407.1; 280/80.1; 180/209
[58] Field of Search ..................... 280/149.2, 407.1, 280/80.1, 405.1, 81.1, 482, 428, 432, 407; 180/209, 24.02, 906

[56] References Cited

U.S. PATENT DOCUMENTS

| | | | |
|---|---|---|---|
| 2,935,332 | 5/1960 | DeLay | 280/81 |
| 2,976,051 | 3/1961 | Morey | 280/81 |
| 3,146,000 | 8/1964 | Holzman | 280/81 |
| 3,177,002 | 4/1965 | Schmidt | 280/149.2 |
| 3,365,211 | 1/1968 | Ginsburg | 280/81 |
| 3,372,946 | 3/1968 | Hutchens | 280/81 |
| 3,778,079 | 12/1973 | Vornberger et al. | 280/80 B |
| 4,237,347 | 6/1981 | Hulse | 280/149.2 |
| 4,286,297 | 9/1981 | Mekosh, Jr. et al. | 280/149.2 |
| 4,635,742 | 1/1987 | Bertolini | 180/209 |
| 4,641,846 | 2/1987 | Ehrhart | 280/149.2 |
| 4,838,566 | 6/1989 | Baxter et al. | 280/149.2 |
| 4,838,578 | 6/1989 | Baxter | 280/149.2 |
| 4,944,522 | 7/1990 | Hart | 280/149.2 |
| 4,993,237 | 2/1991 | Torcomian | 280/407 |
| 5,137,296 | 8/1992 | Forman | 280/407.1 |
| 5,199,732 | 4/1993 | Lauds et al. | 280/407.1 |
| 5,232,234 | 8/1993 | McCombs | 280/149.2 |
| 5,314,201 | 5/1994 | Wessels | 280/149.2 |

*Primary Examiner*—Christopher P. Ellis
*Attorney, Agent, or Firm*—Zarley, McKee, Thomte Voorhees & Sease; Dennis L. Thomte

[57] ABSTRACT

A control circuit is provided for controlling the operation of the solenoid of an air powered actuator which is utilized for retracting the locking pins of a slider used for the adjustment of the suspension of a vehicle longitudinally with respect to the body of the vehicle. The control circuit is operatively connected to the trailer marker lights circuit and must be actuated a predetermined number of times within a predetermined length of time to allow the air powered actuator to be actuated.

8 Claims, 8 Drawing Sheets

MEANS FOR CONTROLLING AN AIR POWERED ACTUATOR FOR RETRACTING THE LOCKING PINS OF A SLIDER

CROSS-REFERENCE TO RELATED APPLICATIONS

This is a continuation-in-part application of application Ser. No. 08/295,203 filed Aug. 24, 1994, entitled "A SAFETY SWITCH FOR AN AIR POWERED ACTUATOR FOR RETRACTING THE LOCKING PINS OF A SLIDER", which was a continuation-in-part application of application Ser. No. 08/243,984 filed May 17, 1994, U.S. Pat. No. 5,460,237, entitled "AN AIR POWERED ACTUATOR FOR RETRACTING THE LOCKING PINS OF A SLIDER", which was a continuation-in-part application of application Ser. No. 08/195,852 filed Feb. 10, 1994, entitled "AN AIR POWERED ACTUATOR FOR RETRACTING THE LOCKING PINS OF A SLIDER".

BACKGROUND OF THE INVENTION

1. Field of the Invention

This invention relates generally to a slider which is used to adjust the suspension of a vehicle longitudinally with respect to the body of the vehicle, and more particularly to an air powered actuator for retracting the locking pins of the slider. In particular, this invention relates to a means for controlling the air powered actuator for retracting the locking pins of the slider.

2. Background of the Invention

Sliders are commonly used to enable longitudinal adjustment of the suspension of a tandem axle trailer relative to the van or body of the trailer. Conventional sliders normally comprise a pair of side rails which are secured to the left and right sides of the van and which extend longitudinally therealong the underside thereof. The suspension of the trailer is carried by a frame which includes left and right slide members which are slidably mounted with respect to the side rails of the van. A plurality of locking pins lock the frame in various positions with respect to the side rails. When it is desired to adjust the suspension of the trailer with respect to the body, the locking pins are retracted to permit the frame to slide with respect to the side rails of the van. However, if the vehicle is not sitting on perfectly level ground, the locking pins may be difficult to pull from their registering openings in the frame and the side rails of the body. Heretofore, the normal procedure for fleeing the locking pins was to have one person pull on the actuating arm connected to the locking pins while the driver attempted to jiggle or jog the trailer with respect to the tandem axle, which had been previously locked in place with the air powered emergency brake. The above solution was not satisfactory and an effort to solve the problem is disclosed in U.S. Pat. No. 4,838,566. Although it is believed that the device of the '566 patent makes the problem described above easier to solve, it is still believed that the device disclosed in the '566 patent does not completely solve the problems of retracting the locking pins from their registering openings in the frame and the side rails of the trailer.

The invention disclosed in application Ser. No. 08/195,852 represented a significant advance in the art. However, the invention described in application Ser. No. 08/195,852 did not include any means which would indicate to the vehicle operator that the locking pins had been completely retracted. Further, the invention of application Ser. No. 08/195,852 did not include any means for indicating the relative position of the vehicle body with respect to the vehicle suspension as the vehicle body is being moved with respect to the vehicle suspension.

The invention disclosed in the co-pending application Ser. No. 08/243,984 solved the problems of the prior art in that it provided a means for indicating to the vehicle operator that the locking pins had been completely retracted and included means for indicating the relative position of the vehicle body with respect to the vehicle suspension as the vehicle body is being moved with respect to the vehicle suspension.

Although the above-identified co-pending applications are believed to represent significant advances in the art, it was found that it was possible, in some situations, for the locking pins to be inadvertently retracted while the vehicle was being moved. To solve such a problem, a safety switch was added to the circuitry, and the same is described in the co-pending application Ser. No. 08/295,203 filed Aug. 24, 1994.

The instant invention provides another safe and effective way to release the locking pins of the slider from the cab of the truck, without any modification to the cab.

SUMMARY OF THE INVENTION

The invention described herein is an improvement over the slider of U.S. Pat. No. 4,838,566 and my co-pending applications in that the solenoid for the air powered actuator is controlled by the truck operator by actuation of the trailer marker lights a predetermined number of times within a predetermined length of time.

In operation, when it is desired to longitudinally adjust the suspension of the trailer with respect to the trailer body, the emergency brake for the tandem axle is first set and locked. The hand lever for the trailer service brakes is then operated to energize the trailer brake circuit light. The driver then turns the trailer marker lights on a predetermined number of times within a predetermined length of time which activates the solenoid which controls the air powered actuator. Thus, unless the trailer emergency brake is in its set and locked position, and unless the hand lever for the trailer service brakes is operated, and unless the marker lights for the trailer are actuated for a predetermined number of times within a predetermined length of time, and left on, the solenoid for the air powered actuator will not be actuated.

It is therefore a principal object of the invention to provide an improved slider for adjustment of the suspension of a trailer longitudinally with respect to the body of the trailer.

A further object of the invention is to provide a safe and effective way of releasing the pins on the slider.

A further object of the invention is to provide an improved slider for the adjustment of the suspension of a trailer longitudinally with respect to the body of the trailer wherein the slider may not be actuated unless the trailer marker lights are actuated for a predetermined number of times within a predetermined length of time and then left on.

A further object of the invention is to provide a safe and effective way to release the locking pins on the trailer tandem slider from the cab of the truck, without any modification to the cab.

Still another object of the invention is to provide a device of the type described above which is safe to use.

These and other objects will be apparent to those skilled in the art.

DESCRIPTION OF THE PREFERRED EMBODIMENT

Figure 10:
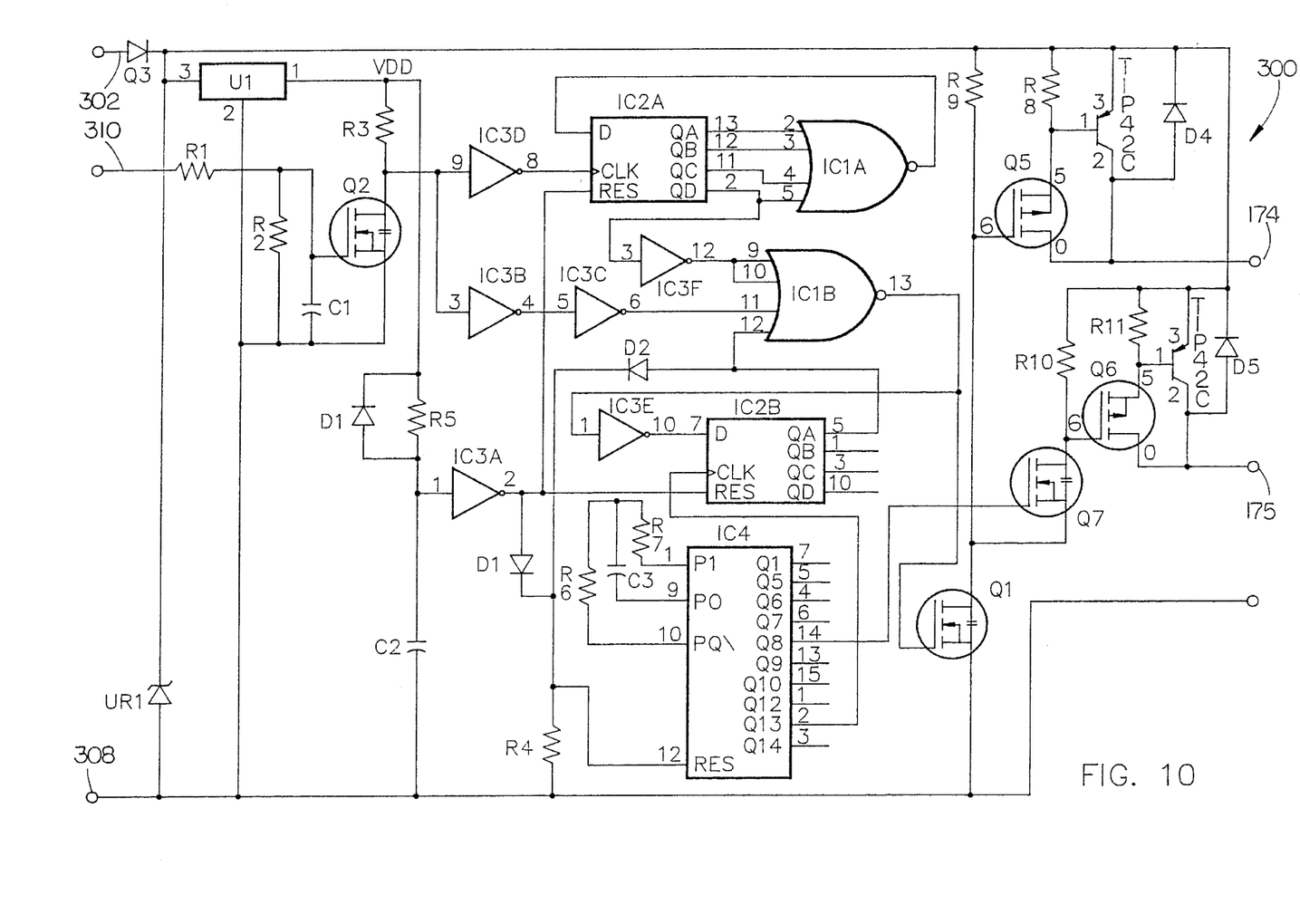
FIG. 10 is a schematic of the circuitry of the safety mechanism of this invention which prevents actuation of the air powered actuator unless the trailer marker lights are actuated a predetermined number of times within a predetermined period of time.
Figure 11:
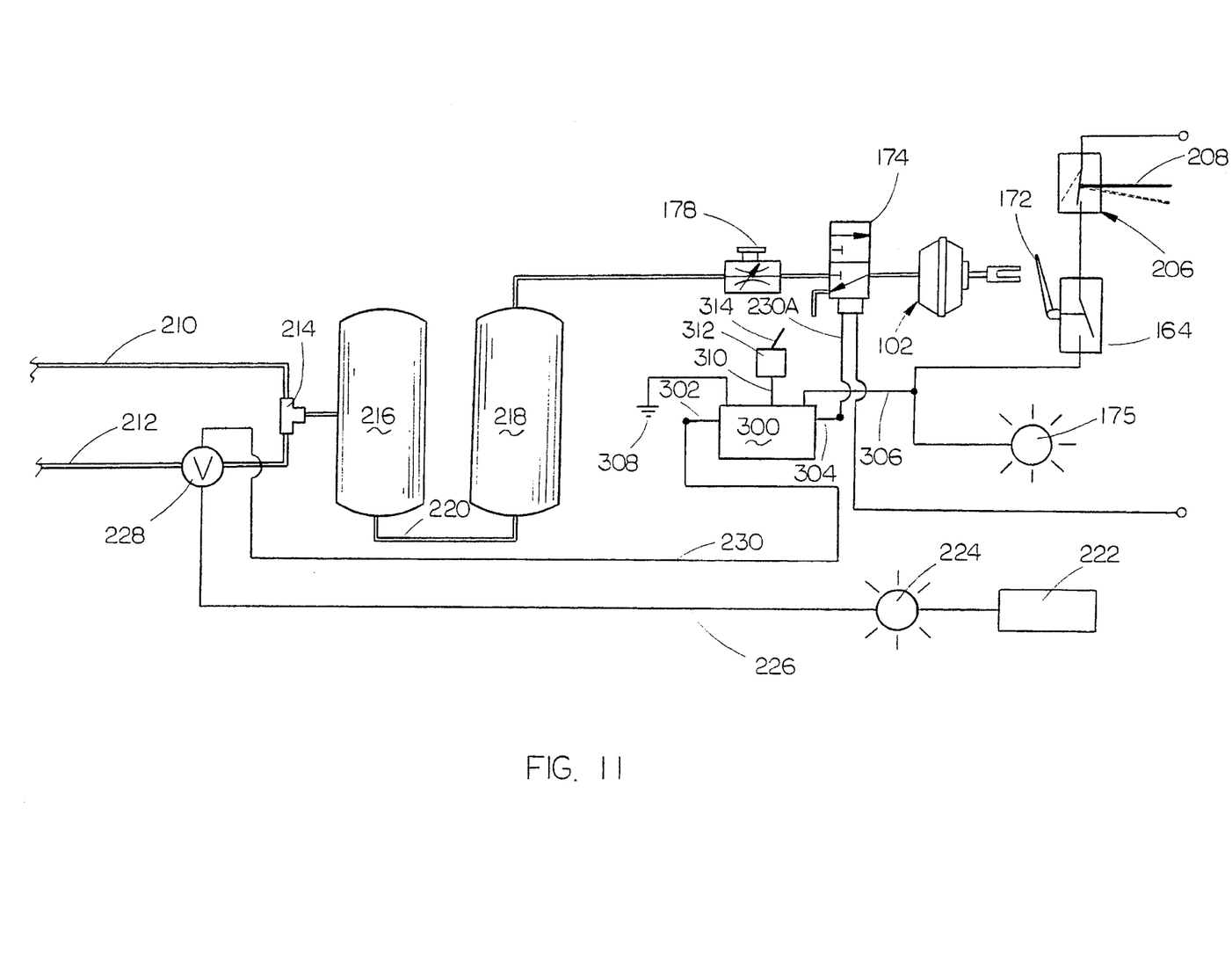
FIG. 11 is a detailed schematic of the circuitry for the control circuit for the solenoid of the air powered actuator.

A portion of applicant's earlier invention disclosed in application Ser. No. 08/295,203 is illustrated in FIGS. 1–9, while FIGS. 10 and 11 illustrate the circuitry of the instant invention. In order to facilitate an understanding of the improvement disclosed herein, FIGS. 1–8 will now be described. With respect to FIGS. 1–8, the numeral 10 refers generally to a trailer which is conventionally pulled by a truck or tractor having a fifth wheel connection thereto. Trailer 10 includes a frame 12 having a plurality of transversely extending cross frame members 14 extending between the sides thereof. A slider 16, such as disclosed in U.S. Pat. No. 4,838,566, is secured to the underside of the cross frame members 14 near the rear end of the trailer 10. The numeral 18 refers to a tandem axle suspension which is operatively connected to the slider 16 for movement longitudinally therewith with respect to the trailer 10.

Figure 5:
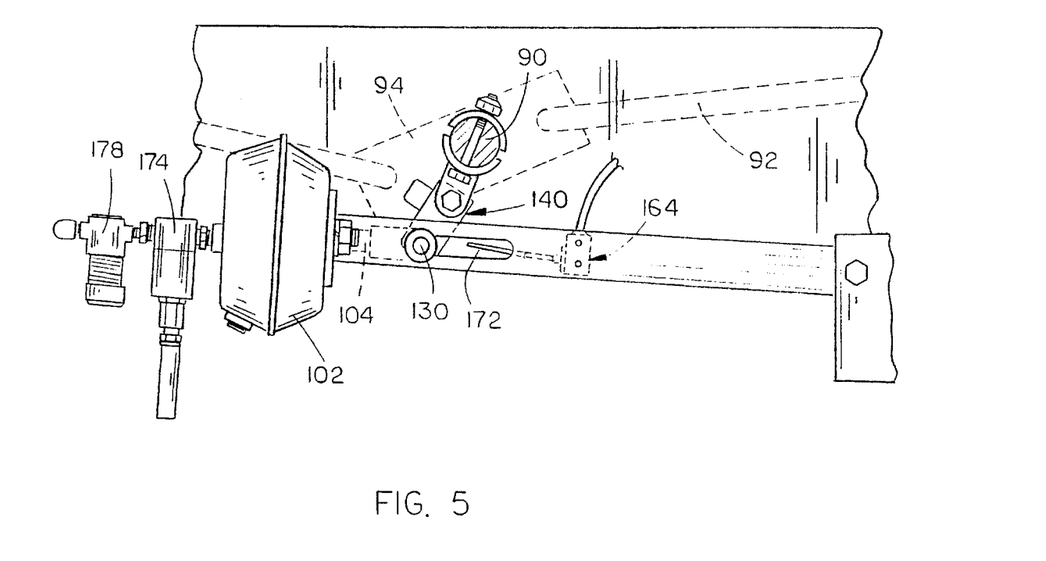
FIG. 5 is a front view of the air powered actuator of this invention which illustrates the air powered actuator in its non-actuating position.

Slider 16 includes a pair of side rails 20 and 22 which are secured to the underside of the cross frame members 14. Side rail 20 is generally Z-shaped and includes a top flange 24, bottom flange 26 and a substantially vertically disposed web 28 interconnecting flanges 24 and 26. As seen in FIG. 5, side rail 22 includes top flange 30, bottom flange 32 and a substantially vertically disposed web 34 which interconnects the flanges 30 and 32.

Figure 1:
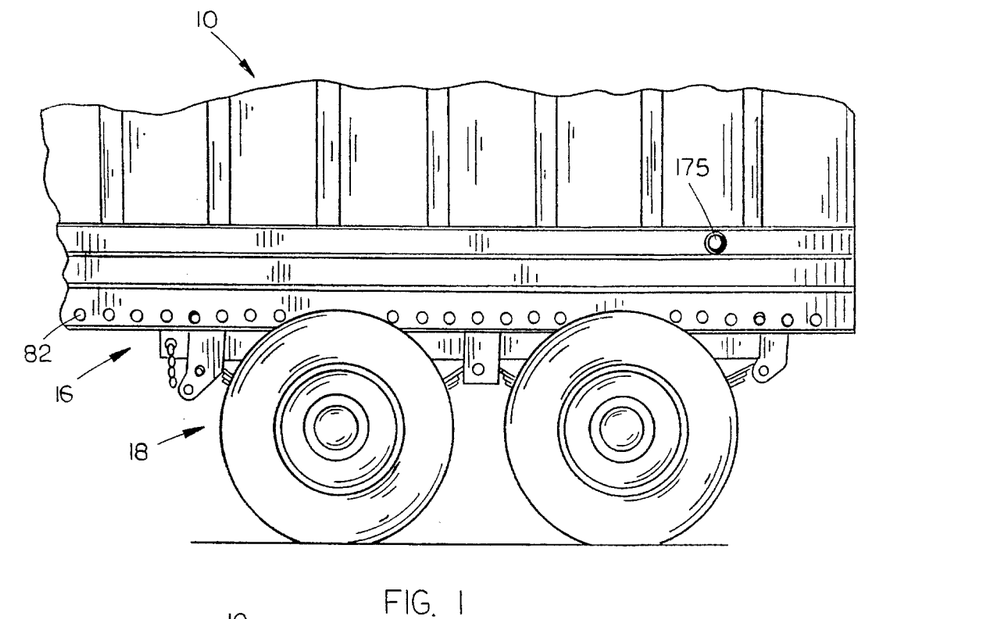
FIG. 1 is a partial side view of the suspension system of a trailer having a tandem axle.
Figure 2:
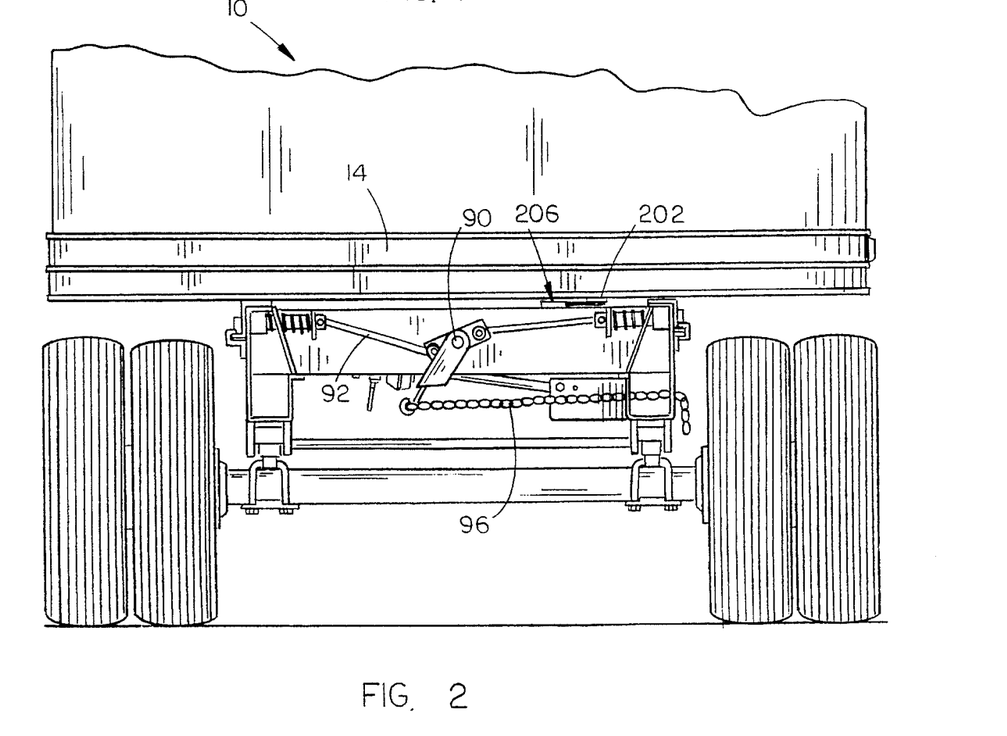
FIG. 2 is a front view of the trailer of FIG. 1.
Figure 3:
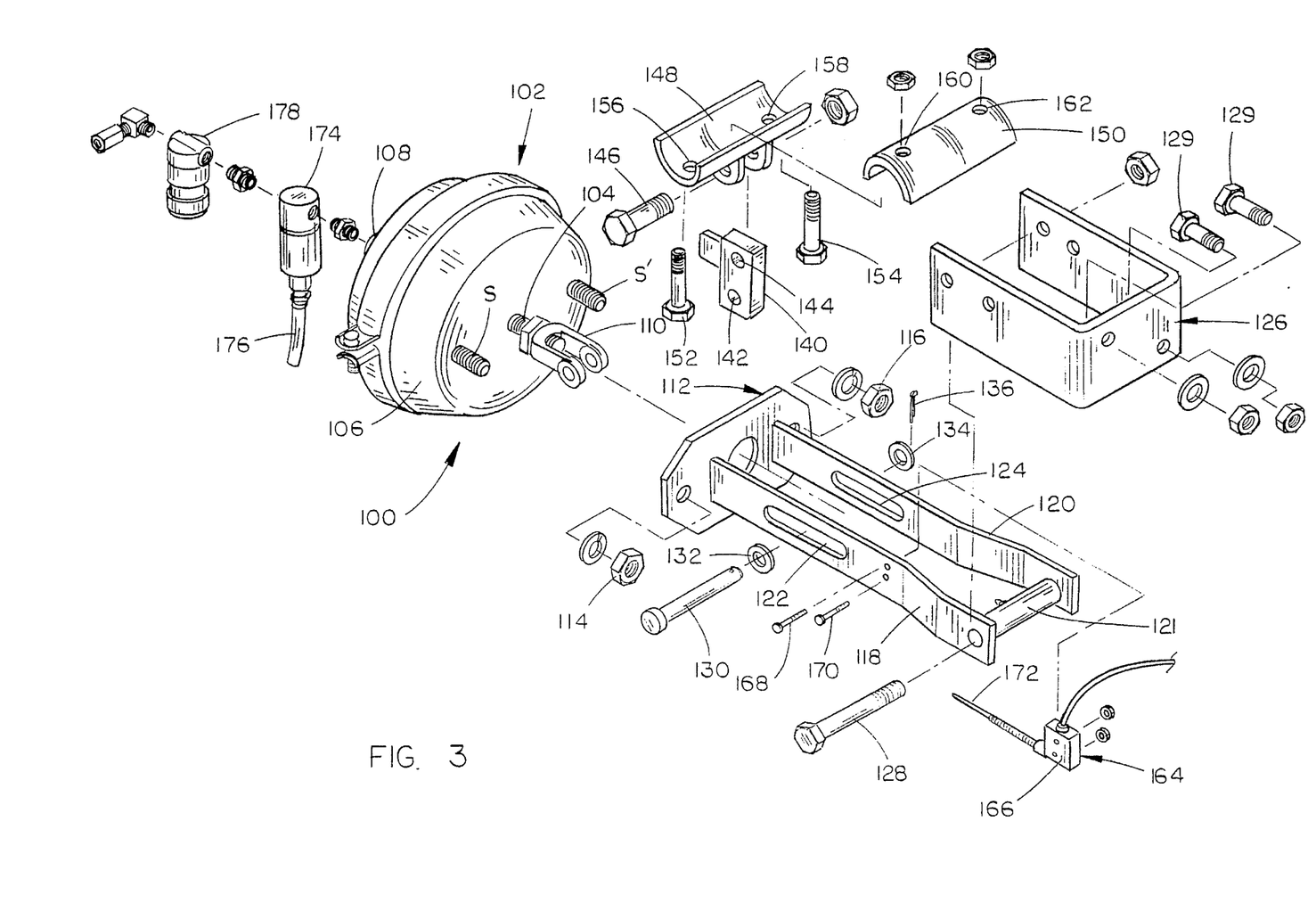
FIG. 3 is an exploded perspective view of the air powered actuator of this invention.
Figure 4:
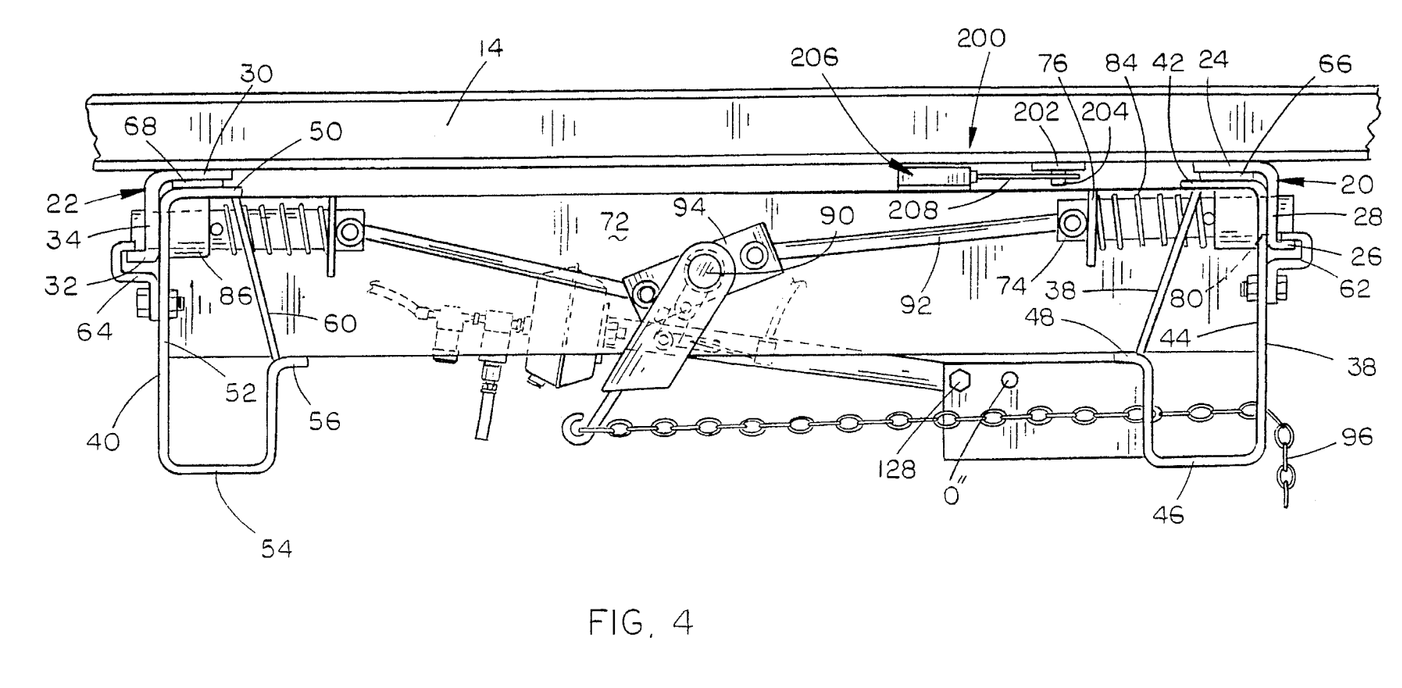
FIG. 4 is a front view of the slider adjustment assembly and the air powered actuator of this invention.
Figure 7:
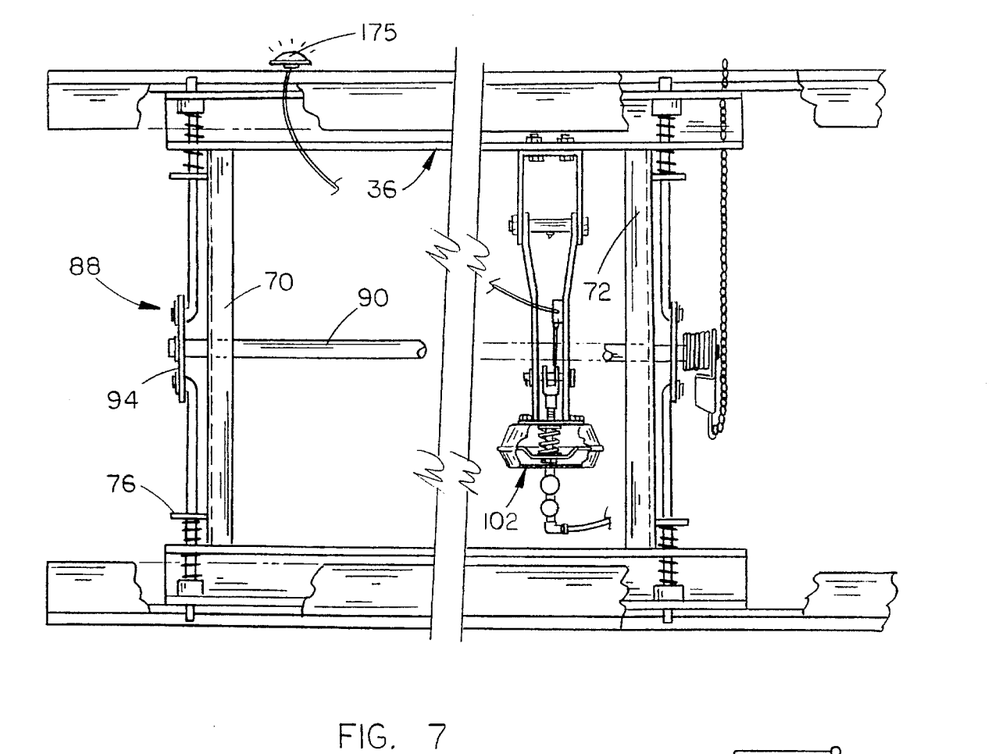
FIG. 7 is a partial top view of the air powered actuator of this invention and its relationship with respect to the slider assembly.

Slider 16 also includes a rectangular frame, generally designated by the reference numeral 36 in FIG. 7, which carries the suspension of the tandem axle and which includes left and right slide members 38 and 40. The slide members 38 and 40 are slidable longitudinally of the van or trailer on the side rails 20 and 22. As is best illustrated in FIG. 4, each of the slide members 38 and 40 are of generally G-shaped in section. Slide member 38 includes an upper inwardly-directed horizontal flange 42 spaced below the upper flange 24 of the side rail 20, a generally vertical side wall 44 disposed inwardly of the web 28 of a side rail, a lower inwardly directed horizontal flange 46, and a lip 48 bent inwardly from the inner end of the lower flange 46. Similarly, slide member 40 has an upper inwardly-directed horizontal flange 50 spaced below the upper flange 30 of side rail 22, a generally vertical side wall 52 disposed inwardly of the web 34 of the side rail 22, a lower inwardly-directed horizontal flange 54, and a lip 56 bent inwardly from the inner end of the lower flange 54. Slide members 38 and 40 are provided with upright reinforcing gussets 58 and 60 respectively, the end result being that each slide member 38 and 40 is a hollow-beam member.

A plurality of hook-shaped sliders 62 are secured to the side wall 44 of the slide member 38 and overlie the lower flange 26 of the side rail 20 as illustrated in FIG. 4. A plurality of hook-shaped sliders 64 are secured to the side wall 52 of the slide member 40 and overlie the lower flange 32 of the side rail 22. The hook-shaped sliders 62 and 64 permit the frame 36 of the slider 16, carrying the suspension, to be slidably longitudinally adjusted relative to the side rails 20 and 22. Pad 66 is provided between the upper flange 42 of slide member 38 and the upper flange 24 of side rail 20 to ensure a relatively close sliding fit between the two members. A pad 68 is provided between the upper flange 50 of slide member 40 and the flange 30 of side rail 22 to also ensure a relatively close sliding fit between the two members. Cross beams 70 and 72 are secured to and extend between the slide members 38 and 40 and extend therebetween. In particular, the cross beams 70 and 72 are secured to the gusset plates 58 and 60.

A plurality of locking pins, each designated with the reference numeral 74 are provided for locking the frame 36 in various positions of adjustment relative to the side rails 20 and 22. Four such pins are illustrated in FIG. 7, two at the front of the slider 16, adjacent opposite slide members 38 and 40, and two at the rear of the slider adjacent opposite slide members 38 and 40. The locking pins 74 are supported by mounting plates 76 secured to the cross beams 70 and 72 for horizontal linear movement in a direction generally transverse to the trailer and are conjointly retractable for permitting adjustment of the frame 36 to various positions of adjustment relative to the side rails 20 and 22 and extensible for locking the frame 36 in a selected position of adjustment. When a pin 74 is in its extended position, it extends through an opening in gusset 58 and through an opening 80 in the respective side wall of the respective slide member 38 or 40. Locking pin 74, when in its extended position, also extends through one of a series of openings 82 in the web of the respective slide member 38 or 40. The openings 82 are spaced at regular intervals to provide the necessary adjustment. Each pin 74 is biased towards its extended position by means of a spring 84 disposed between the mounting plate 76 and a radial flange 86 around the pin towards its outer end.

The locking pins 74 are conjointly movable between extended and retracted positions by means of linkage generally indicated at 88 interconnecting the pins. The linkage 88 comprises a shaft 90 extending longitudinally of the frame generally parallel to the slide members 38 and 40 and approximately midway therebetween. As illustrated in FIG. 7, shaft 90 is journaled in cross frame members 70 and 72 for rotation as will be described hereinafter. A plurality of links 92, one for each locking pin 74, interconnect shaft 90 and the pins 74. As illustrated in FIG. 4, the inner ends of the links 92 connecting the two locking pins 74 at the rear of the slider are pivotally connected to opposite ends of plate 94 which is secured to the shaft 90, and the outer ends of these links are pivotally connected to their respective pins 74. Thus, when shaft 90 is rotated in a first direction, the links 92 will pull the pins 74 from their extended positions to their retracted positions. Conversely, when the shaft 90 is rotated in a direction opposite to that just described, the links 92 will move the pins 74 towards their extended positions. The springs 84 on the locking pins 74 urge the locking pins 74 to their extended positions.

An actuating chain 96 is provided for conventionally rotating the shaft 90 thereby affecting articulation of the links 92 to retract the locking pins 74. In U.S. Pat. No. 4,838,566, the chain 96 is in the form of a rod. The chain 96 extends generally transversely with respect to the trailer and laterally outwardly through the slide member 38. A spring-loaded linkage 98 interconnects the inner end of the chain 96 and the shaft 90 for a purpose which is described in U.S. Pat. No. 4,838,566. It should be noted, that all of the structure previously described is conventional structure, except for chain 96 being substituted for a pull rod, which is disclosed in U.S. Pat. No. 4,838,566. It is the structure described above which applicant believes does not perform satisfactorily thereby necessitating the means of this is invention to power rotate the shaft 90 to positively cause the retraction of the locking pins 74.

For purposes of description, the air powered actuator of this invention is referred to generally by the reference numeral 100. It should be noted that although the air powered actuator 100, which will now be described, is ideally suited for use with the slider described in U.S. Pat. No. 4,838,566, the air powered actuator 100 of this invention may be easily adapted for use with any slider employing retractable locking pins. For example, the air powered actuator of this invention could easily be modified to operate the locking pins disclosed in U.S. Pat. Nos. 2,935,332; 2,978,051; 3,146,000; 3,365,211; 3,372,946; 3,778,079; or 4,838,578.

Air powered actuator 100 includes a pressure cylinder or canister 102 of conventional design having a rod 104 extending from one side of the housing 106. Threaded studs S and S' extend from one side of housing 106. Housing 106 has an air inlet 108 which is connected to a source of air under pressure as will be described hereinafter. When air under pressure is supplied to the housing 106, the rod 104 is extended therefrom in conventional fashion. Preferably, the pressure cylinder 102 is of the type which is normally associated with vehicle air brakes. Although it is preferred that the pressure cylinder or air brake 102 be utilized, the pressure cylinder 102 could be replaced by any suitable fluid cylinder, fluid motor, etc., wherein a movable rod, similar to rod 104, extends therefrom when air or fluid pressure is supplied to the device.

Rod 104 has a clevis 110 mounted thereon which extends through bracket 112 which is secured to the studs S and S' of housing 106 by nuts 114 and 116. Bracket 112 includes a pair of spaced-apart arms 118 and 120 having elongated slots 122 and 124 formed therein respectively. The outer ends of the arms 118 and 120 have a bushing 121 which receives a bolt 128 to pivotally secure the bracket 112 to bracket 126. Bracket 126 is secured to the slide member 38 by bolts 129. Bushing 121 may either be positioned in alignment with the openings 0' or the openings 0" to permit the actuator to be mounted on various sizes of equipment.

Pin 130 is slidably received in the slots 122 and 124 and is maintained therein by means of the washers 132 and 134 positioned on the outer ends thereof outwardly of the arms 118 and 120. Retaining key 136 is received in one end of the pin 130 to maintain the washer 134 on the pin 130.

Link 140 is provided which has an opening 142 at one end thereof which rotatably receives the pin 130. As seen in the drawings, link 140 is rotatably mounted on the pin 130 between the arms 118 and 120. Link 140 is provided with an opening 144 at its other end which receives a bolt 146 to enable link 140 to be pivotally secured to a semi-circular bracket member 148. A semi-circular bracket member 150 is adapted to be secured to the bracket member 148 by means of the bolts 152 and 154 extending through openings 156 and 158 in bracket member 148 and openings 160 and 162 in bracket member 150. Bracket members 148 and 150 are adapted to be secured to the shaft 90 which will have been drilled to provide a pair of openings extending therethrough so that the bolts 152 and 154 may be extended therethrough.

Figure 6:
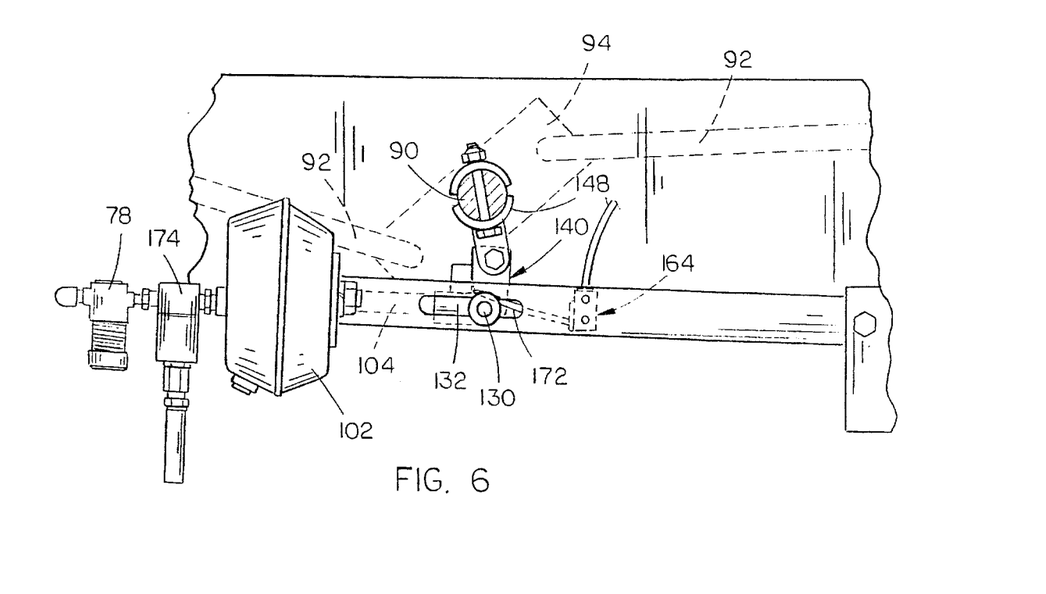
FIG. 6 is a view similar to FIG. 5 except that the air powered actuator has been actuated.

The numeral 164 refers to a microswitch having a housing 166 which is secured to arm 118 by means of bolts 168 and 170. Microswitch 164 includes a switch arm 172 extending therefrom which is in the movable path of the pin 130 as illustrated in FIGS. 5 and 6. When the air actuator is actuated and the pin 130 moves outwardly in the slots 122 and 124, which means that the locking pins have been fully retracted, the light 175 at the side of the vehicle, or other convenient location, will be illuminated as will be described in more detail hereinafter to indicate to the driver that the locking pins have been fully retracted.

FIG. 5 illustrates the rod 104 of cylinder 102 in its normal retracted position. With the rod 104 in the retracted position, the links 92 are in the position so that the locking pins 74 are in their locked or extended position. When it is desired to retract the locking pins 74 to enable the suspension of the trailer to be longitudinally moved with respect to the body of the trailer, air is supplied to cylinder 102 so that rod 104 is extended therefrom. As rod 104 is extended from the cylinder 102, pin 130 is moved laterally outwardly in the slots 122 and 124. The outward movement of the pin 130 in the slots 122 and 124 causes the link 140 to be pivoted which in turn causes the bracket 148 to be pivoted which causes the shaft 90 to be rotated from the position of FIG. 5 to the position of FIG. 6. The rotational movement of the shaft 90 causes the plate 94 to be rotated which causes the links 92 to retract the locking pins 74.

In the event that the locking pins 74 are stuck in their respective openings, due to some binding force thereon, the rod 104 may not be able to be extended by the pressure exerted in the pressure cylinder 102. However, with air pressure being maintained in the cylinder 102, outward force or pressure is applied to the rod 104. The operator of the vehicle then slightly "jogs", "jiggles" or moves the trailer with respect to the tandem axle suspension. As soon as the trailer has been sufficiently moved to relieve the binding forces on the locking pins 74, the outward pressure being exerted on the rod 104 will cause the shaft 90 to be rotated so that the locking pins 74 are retracted. At that time, light 175 will be illuminated as will be described hereinafter.

Figure 8:
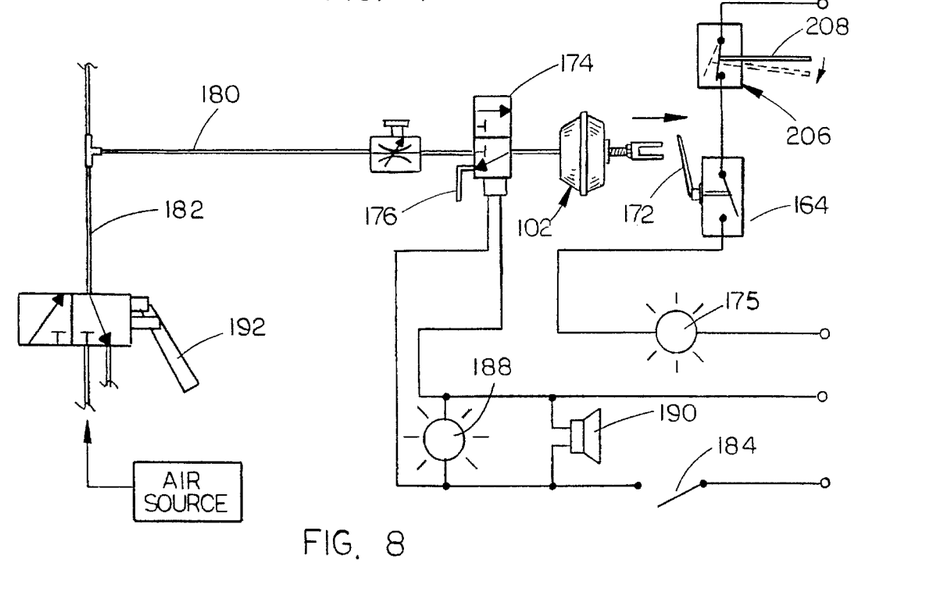
FIG. 8 is a schematic of the circuitry for the air powered actuator of applicant's invention disclosed in application Ser. No. 08/243,984.

An electrically operated air valve 174 is operatively connected to the air inlet 108 of the cylinder 102 and has an exhaust port 176 extending downwardly therefrom. An air regulator 178 is provided on the inlet side of the air valve 174 and is connected to an air line 180 which is connected to the air line 182 as illustrated in FIG. 8.

Air valve 174 is controlled by a switch 184 located on the dash in the operator's cab. When the switch 184 is closed, the air valve 174 is actuated, as is the indicator light 188, to indicate to the operator that the system is being operated to retract the locking pins 74. An audible signal device 190 is also actuated when the switch 184 is closed to further indicate to the operator that air is being supplied to the air actuator. The control or supply of air to regulator 178 and valve 174 is controlled by the air brake control for the brakes on the rear tandem axle. As seen in FIG. 8, the brake control lever 192 is actuated to supply air to the brakes on the rear tandem axle to lock the rear tandem axle in position. At the same time, air is supplied to the inlet side of valve 174. Air is supplied from the valve 174 to cylinder 102 when the normally open switch 184 is closed.

In operation, to summarize somewhat with respect to the embodiment of FIGS. 1–8, when it is desired to adjust the suspension of the rear tandem axle of the trailer with respect to the body of the trailer, lever 192 is actuated to supply air to the brakes on the rear tandem axle to lock the rear tandem axle in position. At the same time, air is supplied to the valve 174. The closing of the switch 184 causes the valve 174 to be opened so that air is supplied to the inlet side of the cylinder 102. At this time, the indicator light 188 and the audible signal device 190 are actuated to indicate to the operator that air is being supplied to the cylinder 102.

When valve 174 is opened, air is supplied to cylinder 102 so that rod 104 is extended therefrom. As rod 104 is extended from the cylinder 102, pin 130 is moved laterally outwardly in the slots 122 and 124. The outward movement of the pin 130 in the slots 122 and 124 causes the link 140 to be pivoted which in turn causes the bracket members 148 and 150 to be pivoted which causes a shaft 90 to be rotated from the position of FIG. 5 to the position of FIG. 6. The rotational movement of the shaft 90 causes the plate 94 to be rotated which causes the links 92 to retract the locking pins 74.

In the event that the locking pins 74 are stuck in their respective openings, due to some binding force thereon, the pin 30 will not be able to move outwardly in the slots 122 and 124. Since pin 30 is unable to move outwardly in the slots 122 and 124, due to the binding action, the microswitch 164 will remain open which will prevent the light 175 from being illuminated. Since the operator is able to detect that the light 175 is not illuminated, he or she will know that the locking pins have not been fully retracted. The operator then jiggles or jogs the trailer as previously described to loosen the binding on the locking pins. When the locking pins 74 have been completely retracted, pin 130 will be in the position illustrated in FIG. 6 which will cause switch arm 172 to be deflected thereby closing switch 164 to illuminate light 175 which provides a signal to the driver that the locking pins 74 have been retracted.

When the locking pins 74 have been retracted and the frame of the trailer body moved with respect to the slider, air valve 174 is de-energized by switch 184 which causes the air in the cylinder 102 to be exhausted through the valve 174 by means of the exhaust port 176. The springs 84 on the locking pins 74 then cause the locking pins 74 to move from their retracted positions to their extended positions.

When the locking pins 74 have been properly positioned in their extended and locked position, the operator then moves the lever 192 to release the brakes on the trailer so that the trailer may be operated in its normal condition.

Although the invention disclosed hereinabove and as shown in FIG. 1–8 did truly represent a significant advance in the art, it was found, as previously stated, that a potentially dangerous situation may exist in that the air powered actuator 100 could be actuated while the trailer was being moved over the road. Thus, the circuitry of FIG. 9 was designed to eliminate the potentially dangerous situation. Further, the circuitry disclosed in FIG. 9 eliminates the need for any additional controls to be mounted in the cab of most trucks which means that the trucks themselves do not have to be modified since all of the modifications are mounted on the trailer. Such a design permits any truck to then be connected to the modified trailer without the need for modifying the truck itself.

Figure 9:
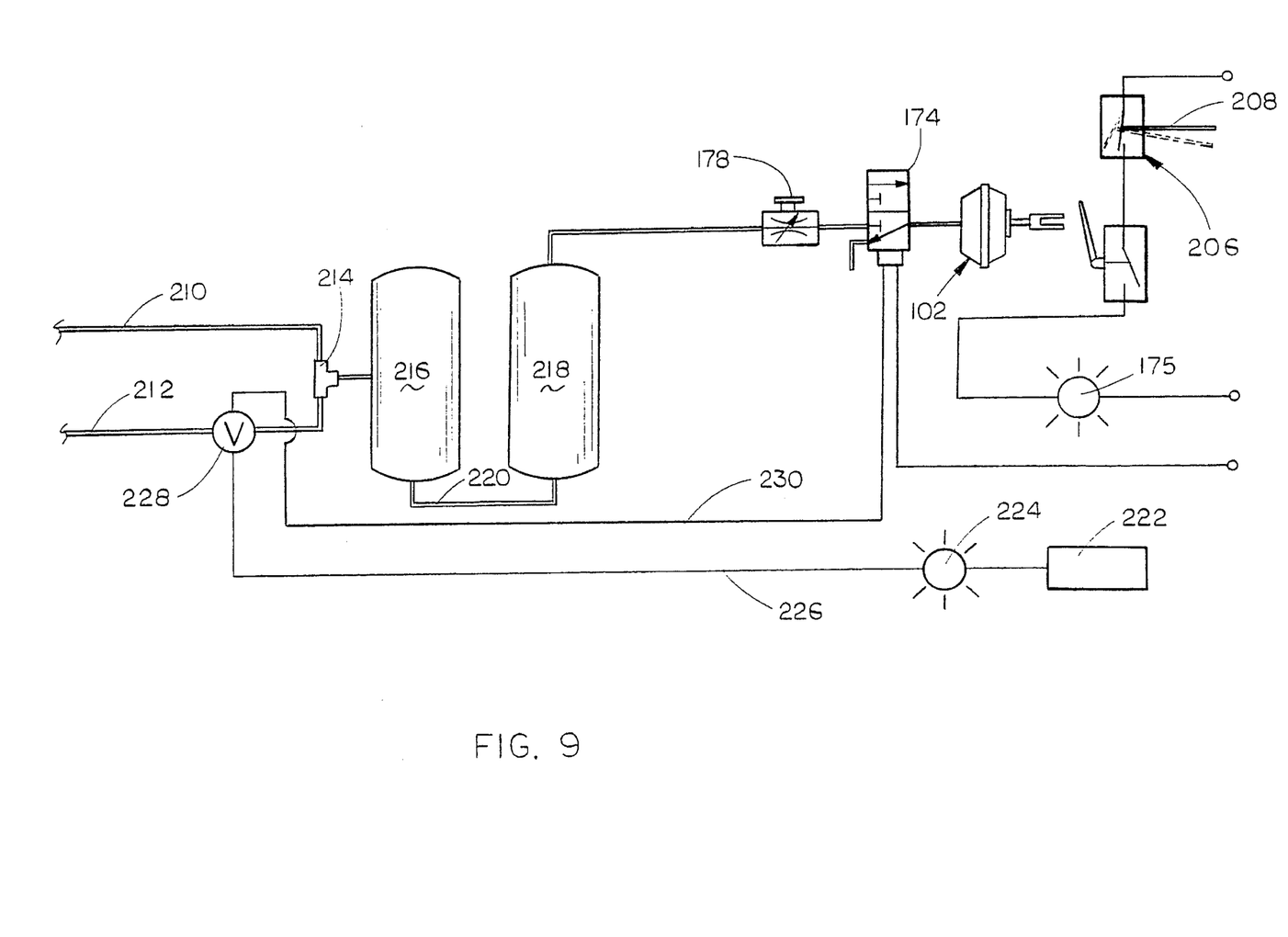
FIG. 9 is a schematic of the circuitry for the safety mechanism which prevents actuation of the air powered actuator unless the trailer emergency brake is in the set and locked position.

In FIG. 9 the numeral 210 designates a service air line while the numeral 212 designates are emergency air line. Lines 210 and 212 are operatively connected to a proportioning valve 214 which is operatively connected to air tanks 216 and 218 which are interconnected by line 220. Air tanks 216 and 218 are operatively connected to the air compressor on the truck in conventional fashion. Service air line 210 extends to the service brakes on the tandem suspension of the trailer while emergency air line 212 extends to the emergency brakes on the tandem suspension of the trailer. As seen in FIG. 9, air tank 218 is operatively connected to the pressure regulator for supplying air under pressure thereto.

In FIG. 9, the numeral 222 refers to the actuator for the hand operated trailer service brakes. Actuator 222 is operatively connected to brake light 224 which is illuminated when the service brakes of the trailer are actuated. Electrical lead 226 is operatively connected to the brake light 224 or its circuit and is operatively connected to a low pressure responsive electrical switch 228 which is operably connected to the emergency brake air line 212 as seen in FIG. 9. Preferably, switch 228 is normally electrically open when air pressure in excess of 54 pounds is present in the emergency brake air line 212. Switch 228 is operatively connected to solenoid valve 174 by electrical lead 230. When switch 228 is electrically open, solenoid valve 174 is is not operable thereby preventing the air powered actuator 100 from being actuated.

In normal trailer operation, air pressure in excess of 60 pounds is normally present in emergency brake air line 212 so that the emergency brake for the tandem axle of the trailer is disengaged. Thus, in normal operation of the trailer, pressure in excess of 60 pounds or the like will be subjected to the air side of switch 228 thereby maintaining switch 228 in its electrically open position so that an electrical circuit is not completed to valve 174 thereby ensuring that the air powered actuator 100 may not be actuated while the trailer is being moved.

When it is desired to adjust the slider, the truck operator stops the truck and trailer and sets the trailer emergency brake which dumps the air in the emergency brake air line 212 to the atmosphere. When the air pressure in line 212 drops below 54 p.s.i., the normally open switch 228 moves to its closed position. The truck operator then applies the hand operated trailer service brakes through the actuator 222 located in the cab so that the brake light circuit of the trailer is actuated so that electrical current is supplied to the switch 228 and thence to the valve 174. Once the electrical circuit is completed through the valve 174, the air actuator 102 will then operate in conventional fashion as in the previously described invention.

Although the inventions disclosed hereinabove and as shown in FIGS. 1–9 are believed to represent significant advances in the art, yet another safe and effective way has been devised to release the pins on the trailer tandem slider from the cab of the truck, without any modification to the cab. The circuitry of the instant invention is illustrated in FIGS. 10 and 11. The circuitry of FIG. 10 is quite similar to that of FIG. 9, and inasmuch as there is such similarity, only the differences between FIG. 10 and FIG. 9 will be described in detail for purposes of conciseness. As seen in FIG. 10, the numeral 300 refers to a control circuit which is provided and which has an input lead 302 connected to electrical lead 230 as illustrated. Output lead 304 extends from circuitry 300 and is connected to lead 230A. Output lead 306 extends Table 1 set forth hereinbelow is the specification for the various components of the control circuit 300. The detailed description of the circuitry follows with reference being made to FIG. 11.

TABLE 1

| REF | TYPE | DESCRIPTION | VENDOR |
| --- | --- | --- | --- |
| C1 | ECQ-V1H105JL | CAP - STACKED FOIL 1.0 uF 50 V | PANASONIC |
| C2 | ECQ-V1H474JL | CAP - STACKED FOIL .47 uF 50 V | PANASONIC |
| C3 | ECQ-V1H153JL | CAP - STACKED FOIL .015 uF 50 V | PANASONIC |
| D1, 2, 4, 5, 6 | 1N4004 | 1 AMP 400 VOLT DIODE | GENERAL INSTRUMENT |
| D3 | G1754CT | 6 AMP 400 VOLT DIODE | GENERAL INSTRUMENT |
| IC1 | C04002B | DUAL 4-IN NOR GATE | HARRIS or NATIONAL |
| IC2 | C04015B | DUAL 4 BIT SHIFT REGISTER | HARRIS or NATIONAL |
| IC3 | C04069B or 74HC14P | HEX SCHMITT TRIGGER INVERTER | HARRIS or NATIONAL |
| IC4 | C04060B | 14 STAGE BINARY COUNTER/OSCILLATOR | HARRIS or NATIONAL |
| R1 | | RES - 200 K ⅛ W CF | ANY |
| R3, 4, 9, 10 | | RES - 10 K ⅛ W CF | ANY |
| R2, 5, 7 | | RES - 100 K ⅛ W CF | ANY |
| R6 | | RES - 50 K ⅛ W CF | ANY |
| R8, 11 | | RES - 100 ⅛ W CF | ANY |
| Q1, 2, 7 | 2N7000 | N CHANNEL MOSFET, TO-92 | ZETEX |
| Q3, 4 | TIP42C | PNP TRANSISTOR TO-220 | HARRIS |
| Q5, 6 | BS250P | P CHANNEL MOSFET TO-92 | ZETEX |
| U1 | 78L05A | VOLTAGE REGULATOR - 5 VOLT | NATIONAL |
| UR1 | P6KE18A | TRANSIENT VOLTAGE SUPPRESSOR 18 V, 600 W | GENERAL INSTRUMENT | from circuitry 300 and is connected to light 175 as illustrated. Circuitry 300 is grounded at 308, as also illustrated in FIG. 10. Input lead 310 extends from the trailer marker light circuit 312 which is controlled by a switch 314 located in the cab of the truck.

Generally speaking, the operation of the solenoid control circuit 300 and the related components is as follows. The truck and trailer are first parked. The trailer emergency brakes are then applied which exhausts air from the emergency brakes so that the air pressure in switch 228 drops below 54 p.s.i. The trailer service brakes are then actuated by the actuator 222 so that the trailer brake light circuit is actuated to feed electrical current to the control circuit 300 through switch 228. The truck operator then activates the marker light circuit 312 by means of the switch 314 for a predetermined number of times within a predetermined length of time after the actuation of actuator 222. Preferably, the switch 314 is actuated for four times within seven seconds and then the marker light circuit is left in the "on" position. The indicator light 175 is then illuminated in a flashing manner which indicates to the operator that an electrical signal has been received by the circuitry 300. When the external limit switch 164 detects that the pins have been pulled, light 175 is illuminated in a steady fashion. If seven seconds pass after the trailer brake lights have been energized without four pulses occurring on the marker light input, the circuitry latches and waits for the brake light circuit to be de-energized before resetting. If more than four pulses occur in the second period, the unit latches and waits for the brake light circuit to de-energize before resetting. Once the locking pins have been pulled and the trailer adjusted to the suspension system, the solenoid 174 is de-energized by turning off the trailer brake light circuit 312. The circuitry 300, and its relationship to the other circuit components of FIG. 10, provides another safe and effective way to release the locking pins on the trailer tandem slider from the cab of the truck, without any modification to the cab.

Power Supply

The power for both logic and outputs is taken from the "supply" input. Input voltage range is 9 to 16 VDC, nominal voltage is 12 VDC. The current required will be determined by the external solenoid and indicator light 175. The internal circuit drain is negligible. Diode D3 provides protection for the unit against a reversed battery connection. Diode D3 is rated at 6 amps, however, practical application indicates total current draw should be limited to 3.5 to 4 amps maximum for the combination of solenoid and light 175. Regulator U1 provides regulated 5 VDC for the control logic. By using 5 volt logic power, the unit can operate over a wide range of input voltages without effect, and the design can use either 4000 series CMOS logic or functionally equivalent 74HC series CMOS components. VR1 is a transient suppresser which provides protection for the regulator from high voltage transients on the supply line.

Marker Input

This is the input that is sensed for the proper input sequence to actuate the solenoid vale 174. The input circuit including R1, R2, R3, C1, and Q1 provide input sensing over a voltage range similar to the power supply range, and provides filtering with a time constant of roughly 100 milliseconds to minimize noise sensitivity.

Logic Design

The control logic includes ICs I through 4, and a diode "or" gate made up of diodes D1 and D2. On power up of the supply, a brief reset pulse is generated by the combination of R5, C2, and IC3A. This reset pulse is fed directly to IC2A and IC2B, and to IC4 through ½ of the diode "or" gate (D1). This ensures that IC2 and IC4 start in the proper state. Diode D6 ensures that the power up reset circuit itself resets quickly when power is removed. After reset, the internal oscillator of IC4 begins timing of the period allowed for actuation (approximately seven seconds). During this period, pulses on the marker input are counted by the combination of IC3D, IC2A, and IC1A. A sequence of three pulses followed by an "on" condition of the marker input, occurring before the seven second period elapses, will actuate the outputs through IC1B. Any sequence of more or less pulses, or not leaving the marker input on the correct pulse, will prevent actuation. If the outputs are inactive at the end of seven seconds, IC2B is clocked by IC4, causing output QA of IC2B to go high, which stops the timer through Diode D2 and disables the outputs through IC1B. The circuit can then only be reset by removing power from the supply input.

Outputs

The circuit provides two outputs, a solenoid driver, and a flasher driver for the indicator light 175. FIG. 11 illustrates the preferred design for the output using N and P channel power FETs. This design uses fewer components and will dissipate less power when outputs are energized. The solenoid 174 is driven by Q3 from IC1B, with diode D4 providing protection against inductive kickback and reversed polarity. Coil lead connections are indicated in FIG. 11. The indicator light 175 is driven by IC4 through Q1 and Q4. The series connection of Q1 and Q3 ensures that the light 175 will only flash when the solenoid 174 is energized. Resisters R10 and R11 provide turn-on due to leakage currents. Diode D5 provides reversed polarity protection.

The above-described description is not intended to be limiting, but is merely one method or means of operating the solenoid 174. Further, although it is preferred that the low pressure switch 228 be employed, the solenoid 174 could be operated by the circuit 300, with a slight modification thereof, which would eliminate the need for the trailer emergency brakes to be actuated. Additionally, although it is preferred that the solenoid 174 is operated by first applying the brakes and then flashing the marker lights a predetermined number of times within a predetermined time, the solenoid 174 could be controlled by first actuating the marker lights and then successively applying the brakes a predetermined number of times within a predetermined time.

Thus it can be seen that the invention accomplishes at least all of its stated objectives.

I claim:

1. In combination:
   a trailer including a body having a rearward end, a forward end, and a suspension system including an emergency air brake system and a service air brake system;
   said emergency air brake system being movable to a set and locked position;
   hitch means at the forward end of said trailer for connection to a truck;
   said trailer including a service brake light circuit and a marker light circuit;
   said trailer including a slider for the adjustment of said suspension system with respect to the body of said trailer;
   a truck for connection to said trailer; said truck including means for supplying air under pressure to said service air brake system and to said emergency air brake system;
   said truck including a first means for actuating said service brake light circuit, a second means for actuating said marker light circuit, and a third means for actuating said emergency brake system;
   said slider comprising a pair of side rails adapted to be secured to the left and right sides of the body in a fixed position extending longitudinally of the body, each of said side rails having a plurality of horizontally spaced openings formed therein, a frame adapted to carry the suspension comprising left and right slide members slidable longitudinally of the body on the side rails, at least one locking pin operatively mounted on each of said slide members for longitudinal movement therewith relative to said side rails, said locking pins being retractable for permitting adjustment of the frame to a selected position of adjustment and extensible into one of said openings in said side rails for locking the frame in a selected position of adjustment, air powered actuator means for retracting said locking pins including linkage interconnecting said pins for conjoint movement of the pins between extended and retracted positions;

an electrical solenoid operatively connected to said air powered actuator means for controlling the operation of said air powered actuator means;

said trailer having a signal light thereon which is visible to the truck operator and which is illuminated when said locking pins have been retracted;

a safety switch means operatively connected to said solenoid and said third means which prevents the actuation of said air powered actuator means unless said trailer emergency air brake system is in its set and locked position;

and a control circuit operatively connected to said safety switch means, said marker light circuit, said signal light and said solenoid whereby said second means must be actuated a predetermined number of times within a predetermined length of time before said solenoid will actuate said air powered actuator means to retract said locking pins.

2. In combination:
   a trailer including a body having a rearward end, a forward end, and a suspension system including an emergency air brake system and a service air brake system;
   said emergency air brake system being movable to a set and locked position;
   hitch means at the forward end of said trailer for connection to a truck;
   said trailer including a service brake light circuit and a marker light circuit;
   said trailer including a slider for the adjustment of said suspension system with respect to the body of said trailer;
   a truck for connection to said trailer; said truck including means for supplying air under pressure to said service air brake system and said emergency air brake system;
   said truck including a first means for actuating said service brake light circuit, a second means for actuating said marker light circuit, and a third means for actuating said emergency brake system;
   said slider comprising a pair of side rails adapted to be secured to the left and right sides of the body in a fixed position extending longitudinally of the body, each of said side rails having a plurality of horizontally spaced openings formed therein, a frame adapted to carry the suspension comprising left and right slide members slidable longitudinally of the body on the side rails, at least one locking pin operatively mounted on each of said slide members for longitudinal movement therewith relative to said side rails, said locking pins being retractable for permitting adjustment of the frame to a selected position of adjustment and extensible into one of said openings in said side rails for locking the frame in a selected position of adjustment, air powered actuator means for retracting said locking pins including linkage interconnecting said pins for conjoint movement of the pins between extended and retracted positions;

an electrical solenoid operatively connected to said air powered actuator means for controlling the operation of said air powered actuator means;

said trailer having a signal light thereon which is visible to the truck operator and which is illuminated when said locking pins have been retracted;

and a control circuit operatively connected to said marker light circuit, said signal light and said solenoid whereby said second means must be actuated a predetermined number of times within a predetermined length of time before said solenoid will actuate said air powered actuator means to retract said locking pins.

3. The combination of claim 2 wherein said trailer includes a signal light which is visible to the truck operator and which is operatively connected to said control circuit so that said signal light will be sequentially illuminated, when said second means has been actuated said predetermined number of times in said predetermined length of time, to indicate that an electrical signal has been received by said control circuit.

4. The combination of claim 3 wherein said signal light is continually illuminated, after having been sequentially illuminated, when said locking pins have been retracted.

5. In combination:

a trailer including a body having a rearward end, a forward end, and a suspension system including a service air brake system, a service brake light circuit, and a marker light circuit;

connection means at the forward end of said trailer for connection to a truck;

a truck for connection to said trailer;

said truck including means for supplying air under pressure to said service air brake system;

said truck including a first means for actuating said service brake light circuit and a second means for actuating said marker light circuit;

said slider comprising a pair of side rails adapted to be secured to the left and right sides of the body in a fixed position extending longitudinally of the body, each of said side rails having a plurality of horizontally spaced openings formed therein, a frame adapted to carry the suspension comprising left and right slide members slidable longitudinally of the body on the side rails, at least one locking pin operatively mounted on each of said slide members for longitudinal movement therewith relative to said side rails, said locking pins being retractable for permitting adjustment of the frame to a selected position of adjustment and extensible into one of said openings in said side rails for locking the frame in a selected position of adjustment, air powered actuator means for retracting said locking pins including linkage interconnecting said pins for conjoint movement of the pins between extended and retracted positions;

an electrical solenoid operatively connected to said air powered actuator means for controlling the operation of said air powered actuator means;

said trailer having a signal light thereon which is visible to the truck operator and which is illuminated when said locking pins have been retracted;

and a solenoid control circuit operatively connected to said marker light circuit, said signal light, and said solenoid whereby said second means must be actuated a predetermined number of times within a predetermined length of time before said solenoid will actuate said air powered actuator means to retract said locking pins.

6. The combination of claim 5 wherein said second means must be actuated said predetermined number of times within a predetermined length of time after said first means has actuated said service brake light circuit.

7. The combination of claim 6 wherein said second means must be actuated four times within seven seconds after said first means has actuated said service brake light circuit.

8. In combination:

a trailer including a body having a rearward end, a forward end, and a suspension system;

hitch means at the forward end of said trailer for connection to a truck;

said trailer including a service brake light circuit and a marker light circuit;

said trailer including a slider for the adjustment of said suspension system with respect to the body of said trailer;

a truck for connection to said trailer;

said truck including a first means for actuating said service brake light circuit and a second means for actuating said marker light circuit;

said slider comprising a pair of side rails adapted to be secured to the left and right sides of the body in a fixed position extending longitudinally of the body, each of said side rails having a plurality of horizontally spaced openings formed therein, a frame adapted to carry the suspension comprising left and right slide members slidable longitudinally of the body on the side rails, at least one locking pin operatively mounted on each of said slide members for longitudinal movement therewith relative to said side rails, said locking pins being retractable for permitting adjustment of the frame to a selected position of adjustment and extensible into one of said openings in said side rails for locking the frame in a selected position of adjustment, air powered actuator means for retracting said locking pins including linkage interconnecting said pins for conjoint movement of the pins between extended and retracted positions;

an electrically operated air valve connected to said air powered actuator means for controlling the operation of said air powered actuator means;

and a control circuit operatively connected to said marker light circuit and said service brake light circuit whereby one of said first and second means must be actuated a predetermined number of times within a predetermined length of time after the other of said first and second means has been actuated before said air valve will actuate said air powered actuator means to retract said locking pins.

\* \* \* \* \*